Dec. 26, 1950     A. D. WAY     2,535,181
TURBIDITY DETECTOR
Filed July 21, 1947
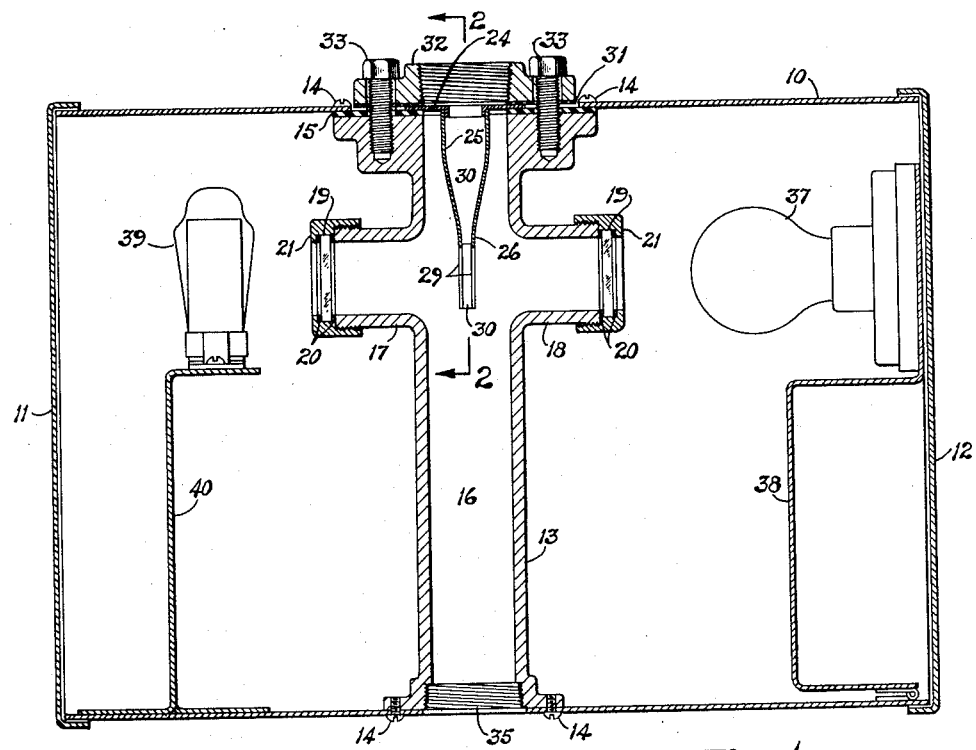
Fig. 1
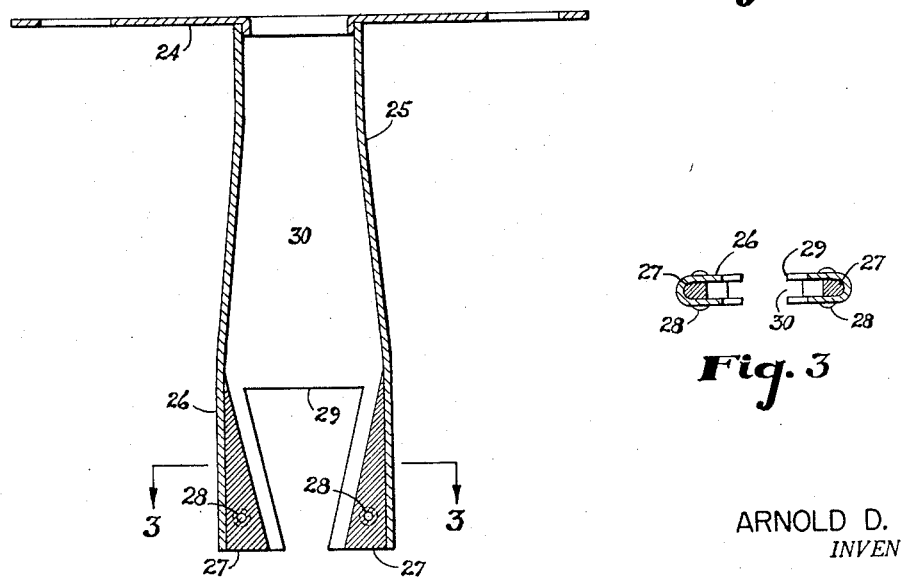
Fig. 2
Fig. 3
ARNOLD D. WAY
*INVENTOR.*
BY Patented Dec. 26, 1950

2,535,181

UNITED STATES PATENT OFFICE 2,535,181

TURBIDITY DETECTOR

Arnold D. Way, Bronxville, N. Y., assignor to The Permutit Company, New York, N. Y., a corporation of Delaware Application July 21, 1947, Serial No. 762,227

2 Claims. (Cl. 88—14)

This invention relates to turbidity detectors; and it comprises a guide tube for producing a freely and smoothly flowing sheet of liquid of uniform thickness, a light source projecting a beam of light through said sheet, and a light-sensitive cell receiving light shining through said sheet; all as more fully hereinafter set forth and as claimed.

In many arts and processes it is desirable to determine the turbidity of fluids, and various devices involving the use of light-sensitive cells for such determination of turbidity have been suggested. There is room for improvement, however, in the reliability of such devices and in the amount of attention required to maintain them in operation. For instance, the liquid being tested has a tendency to deposit some of the turbidity which it carries on any surface past which it flows. When the beam of light passes through walls made of glass or other transparent material and used to confine the liquid being tested, such walls become gradually coated, thus interfering with and falsifying the measurement.

It is the object of my invention to provide a more reliable device for detecting turbidity which requires a minimum of attention; and more particularly to provide a device in which the light beam does not pass through any surfaces which are wetted by the liquid being tested.

The manner in which this object is achieved is shown in the appended drawing in which:

Fig. 1 is a view, partly in section, of a turbidity detector in accordance with my invention;

Fig. 2 is a view, in section along lines 2—2 of Fig. 1, of the guide tube, on an enlarged scale; and Fig. 3 is a view, in section along lines 3—3 of Fig. 2.

Like numerals refer to like parts throughout the several views.

As shown in Fig. 1 the apparatus has a casing 10 provided with removable covers 11 and 12. Within the casing 10 and fastened thereto by means of screws 14 is a cross-shaped body 13, a gasket 15 being provided between the top of the body and the casing 10. The body 13 has a central passage 16 and two side extensions 17 and 18 on the ends of which lenses 19 with gaskets 20 are attached by means of screw covers 21.

Within the passage 16 is mounted a guide tube 25 shown in greater detail in Figs. 2 and 3. The guide tube 25 is fastened to a flange 24, as by brazing or soldering. The upper portion of the guide tube 25 is of circular cross section and its lowermost portion is flattened at 26. Within the flattened portion there are two wedge shaped filler pieces 27 held in place by rivets 28. The guide tube 25 thus provides a passageway 30 which changes from a circular cross section at the top to a rectangular cross section within the portion 26. The part of the passageway within the flattened portion 26 is of uniform thickness but of downwardly decreasing width because of the presence of the filler pieces 27. The flattened sides of the portion 26 are cut out at 29.

The guide tube is set into the body 13 with the flange 24 resting on gasket 15. An additional gasket 31 is placed on top of the flange 24, and a companion flange 32 attached to the body by means of bolts 33 holds the flange 24 in place and provides an inlet into the top of passage 30 for liquid to be tested. The lower end of the body 13 is threaded at 35 for connection of a pipe to carry the tested liquid away.

Within the casing 10 is a light source 37 mounted on a hinged support 38 and so arranged as to throw a beam of light through the lenses 19 and the cut-outs 29. A light-sensitive cell 39 is mounted on a bracket 40 in such a position as to receive light shining through the cut-outs 29.

In operation, liquid to be tested enters through the companion flange 32 into the passageway 30 and flows past the cut-outs 29 in the form of a freely and smoothly flowing sheet of uniform thickness because of the particular shape of the passageway 30. Light shining from the source 37 thus passes the lenses 19 and the sheet of liquid flowing past the cut-outs 29 before it reaches the light-sensitive cell 39, the intensity of light reaching the cell 39 therefore depending on the amount of turbidity present in the liquid.

When the liquid is free of turbidity the light reaches cell 39 with maximum intensity. The cell then generates a relatively strong electric current. If any turbidity appears in the liquid the intensity of light reaching the cell 39 diminishes and the strength of the electric current generated by the cell 39 is reduced accordingly. The intensity of the electric current generated by cell 39 is thus a measure of the turbidity present in the liquid being tested and may be utilized in known ways to actuate a signal or control device. A suitable arrangement of electrical devices is shown, for example, in the U. S. Patent 2,361,235 to E. Pick, dated October 24, 1944, but other circuit arrangements may be employed. The electrical devices are advantageously mounted within the casing 10 on the hinged support 38 and the bracket 40.

My apparatus may, for instance, be used in connection with the treatment of water in accordance with the process disclosed in the U. S. Patent 2,021,672 to Spaulding, dated November 19, 1935. In such process the water, when properly treated, has a relatively low turbidity of the order of 5-10 parts per million. When the process is not functioning correctly the turbidity of the treated water rises and its measurement thus provides an excellent check on the performance. In such Spaulding process there is a filter blanket of highly concentrated sludge having a turbidity of the order of several thousand parts per million. Such blanket continues to build up as the process is carried on and it is necessary from time to time to blow off a portion of it so as to keep such blanket within proper bounds. My apparatus may also be used, by sampling the water at a level corresponding to the maximum desired sludge blanket level to indicate by a signal when such maximum level has been reached, or to automatically open a blowoff valve.

My apparatus may, of course, be used for determining the turbidity of liquids other than water, and it may also be employed for determining the intensity of color instead of turbidity.

The beam of light does not pass through any surface wetted by the liquid being tested, the lenses 20 being so located that they are not exposed to wetting. Such lenses are not essential to the functioning of my detector, but are advantageously provided to prevent excessive humidity within the casing 10 which might be harmful to the electrical devices installed therein. When used for this purpose only, the lenses may have parallel sides, but, if desired, they may be so shaped as to concentrate the light beam projected from the source 37 toward the cell 39.

The important function of the guide tube 25 is to produce a freely and smoothly flowing sheet of liquid of uniform thickness, free of waves and spray which would affect the passage of light.

While I have shown the guide tube as made from a cylindrical tube by flattening a portion, inserting filler pieces and cutting out the flattened portion, it may, of course, be made in other ways to provide a downwardly converging passageway ending in a flat portion with parallel sides facing the light source and the light-sensitive cell. Thus, the guide tube might be made as a casting, or molded from hard rubber or plastic. A passageway one-eighth inch thick and five-eighths inch wide at its lowermost end will give good results with a flow of liquid at a rate somewhat less than one gallon per minute.

While I have shown and described what I consider the preferred arrangement, modifications may be made without departing from the spirit of my invention and reference is therefore made to the following claims for a definition of the scope of my invention.

What I claim is:

1. A turbidity detector guide tube having a straight vertical passageway therein, the lowermost portion of said guide tube being flattened to provide two parallel sides and reduce said passageway to uniform thickness, two wedge shaped filler pieces within said flattened portion so placed as to make the width of said passageway downwardly converging in width, matching cut-outs in both said parallel sides, and means for admitting liquid to the upper end of said vertical passageway.

2. A turbidity detector comprising a cross-shaped body having a horizontal and a vertical passage therein, a guide tube mounted in said vertical passage and having a vertical passageway therein, said passageway having its lowermost portion of rectangular cross-section with two sides parallel to each other, cut-outs in said parallel sides aligned with said horizontal passage to permit light to pass through said horizontal passage, means for admitting liquid to the upper end of said vertical passageway, and lenses mounted on said body on either side of said cut-outs.

ARNOLD D. WAY.

REFERENCES CITED

The following references are of record in the file of this patent:

UNITED STATES PATENTS

| Number | Name | Date |
|---|---|---|
| 1,053,665 | Spencer | Feb. 18, 1913 |
| 1,496,635 | Higley | June 3, 1924 |
| 1,785,392 | Sawford et al. | Dec. 16, 1930 |
| 1,785,393 | Sawford | Dec. 16, 1930 |
| 1,809,999 | Wier | June 16, 1931 |
| 1,814,020 | Armstrong | July 14, 1931 |
| 1,979,649 | Stephenson | Nov. 6, 1934 |
| 1,994,768 | Haven et al. | Mar. 19, 1935 |
| 2,026,743 | Kurtz | Jan. 7, 1936 |